Nov. 3, 1942.　　　　T. W. MILTON　　　　2,300,517
METHOD OF MANUFACTURING SHIELDING CONDUIT ASSEMBLIES
Filed April 6, 1942
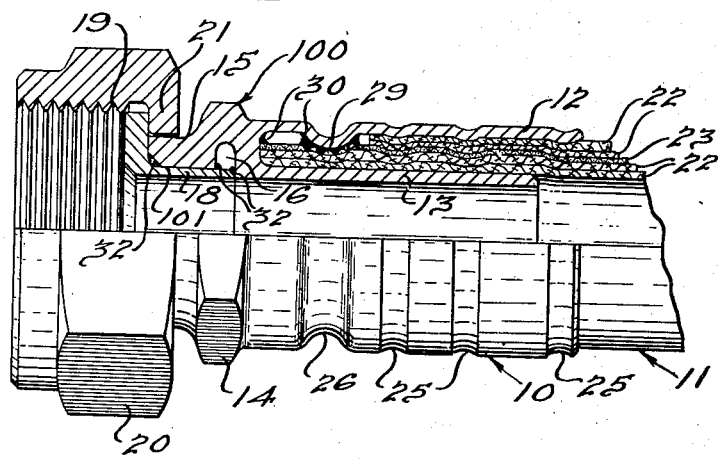
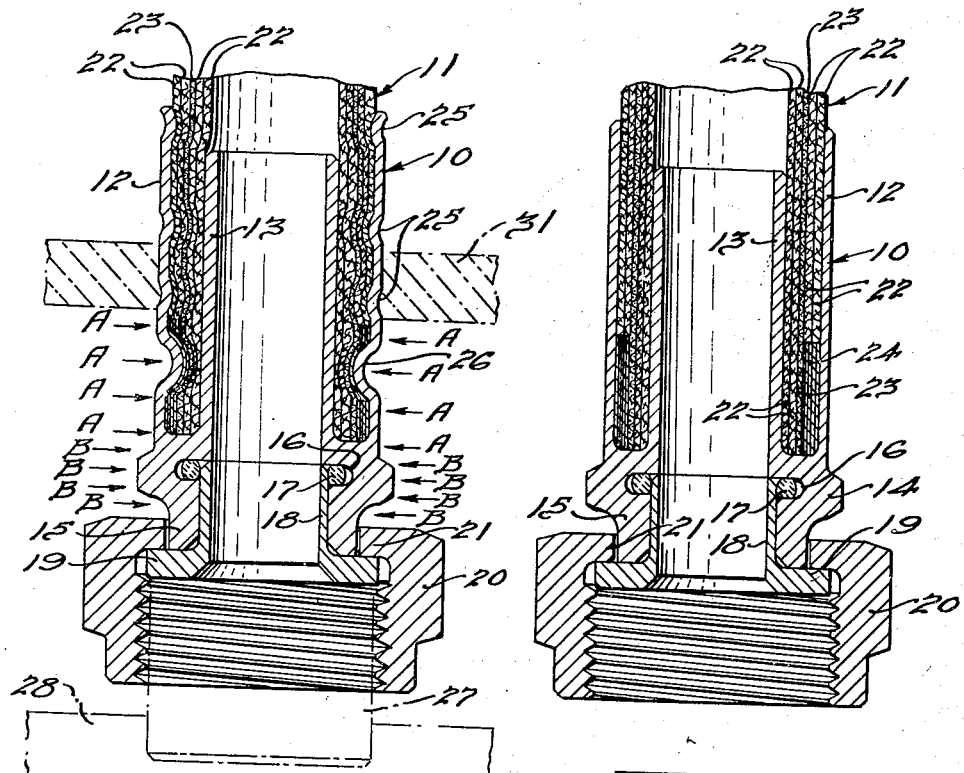
INVENTOR
Thomas W. Milton.
BY
ATTORNEY Patented Nov. 3, 1942

2,300,517

UNITED STATES PATENT OFFICE 2,300,517

METHOD OF MANUFACTURING SHIELDING CONDUIT ASSEMBLIES

Thomas W. Milton, Detroit, Mich., assignor to The Flex-O-Tube Company, a corporation of Delaware Application April 6, 1942, Serial No. 437,747

2 Claims. (Cl. 154—8)

This invention relates to the method of manufacturing shielding conduit assemblies and in particular to the method of assembling coupling members on fiber glass and wire braid type flexible shielding conduit.

The development of shielding conduit composed of a wire braid disposed between a plurality of layers of lacquer coated fiber glass fabric has presented difficulties in assembling, anchoring, and electrically connecting coupling members to such shielding conduit. Because of the fact that each layer of lacquer coated fiber glass fabric is free to move with respect to adjacent layers and the wire braid, a sure and permanent means of uniformly anchoring the conduit in the coupling member and positively grounding the wire braid of the conduit to the coupling member is necessary to prevent the conduit from pulling out the fitting.

To accomplish the foregoing, the method of manufacturing shielding conduit assemblies herein disclosed was conceived and has been found to produce completely satisfactory results.

The novel method employed gives perfect results in that the shielding conduit becomes fixed in the coupling member by being gripped therein but the shielding conduit is further anchored in the coupling member by providing a uniform combined electrical and structural annular bond between the outer shell of the coupling member and the woven wire braid shield which prevents eccentric creeping of the woven wire shield within the conduit near the end thereof. By uniformly anchoring the woven wire shield annularly around the inner periphery of the coupling member, the hazard of failure under extreme flexing and tension at the coupling member is reduced. Ordinary brazing wherein the uniformity of the bond of the brazing or soldering depends upon the flow of the brazing or soldering materials and the adequacy of the flux will not produce the uniform and dependable results accomplished by the instant invention.

Many other advantages of the invention will become apparent by reference to the following detailed description taken in connection with the accompanying drawing, in which:

Fig. 1 is an enlarged longitudinal view, part in section and part in elevation, showing a shielding conduit having a coupling member uniformly mechanically anchored thereon and electrically connected thereto in accordance with this invention.

Fig. 2 is an enlarged sectional view showing the method of preparing the coupling member and conduit for crimping and brazing.

Fig. 3 is an enlarged sectional view similar to Fig. 2 showing the fitting and coupling member crimped ready for brazing and a preferred application of brazing heat thereto.

Referring now to the drawing wherein like numerals refer to like and corresponding parts throughout the several views, the illustrative embodiment of the invention disclosed is shown in conjunction with a coupling member 10 and a flexible shielding conduit 11. The particular coupling member shown comprises an outer shell 12 and inner tubular stem 13 concentric to and preferably integral with the said outer shell 12. At the annular base 100 of the said coupling member 10 is a hexagonal wrench grip 14 from which a sleeve 15 extends. An inner circumferential groove 16 is provided in the base 100 of the coupling member 10 to accommodate a charge of solder 17 as indicated in Figs. 2 and 3 by means of which a nut retaining sleeve 18 having a radially extending collar 19 is permanently brazed to the coupling member 10. The base 100 of the said coupling member 10 is counterbored at 101 to accommodate the said nut retaining sleeve 18 so as to provide a full diameter inner passage through the said coupling member 10. An internally threaded nut 20 formed with an annular shoulder 21 to swivel axially about the base of the fitting 10 is retained thereon by means of the said radially extending collar 19 of the said nut retainer sleeve 18, the said nut retainer sleeve 18 being telescoped through the said nut 20 as indicated in Figs. 2 and 3 prior to assembling and brazing the nut retainer sleeve 18 into the end of the base of the said coupling member 10. Although a swivel nut 20 is shown on the coupling member 10, it is obvious that a fixed nut or a male threaded end may be formed on the base of the said fitting 10; the instant invention relating to the novel and facile method of anchoring and electrically bonding the shielding conduit 11 positively and uniformly in the coupling member 10 around the inner periphery of the outer shell 12 thereof without damage to the fiber glass-woven wire type flexible shielding conduit 11.

The flexible shielding conduit 11 preferably comprises one or more inner composite layers 22 each composed of wire glass fabric coated with a heat resistant lacquer, a layer of woven wire 23 serving as a radio shield and conduit reinforcement, and one or more outer composite layers 22 each composed of wire glass fabric coated with a heat resistant lacquer. The said flexible shielding conduit 11 is characterized by each composite layer 22 being slidable during flexing on the composite layer 22 therebelow or on the woven wire shield 23. The particular flexible shielding conduit shown comprises two inner composite layers 22, one woven wire shielding layer 23, and two outer composite layers 22.

To prepare the said flexible shielding conduit 11 for mechanical and electrical union with the coupling member 10, the two outer composite layers 22 of wire glass fabric coated with heat resistant lacquer are stripped back a short distance from the end of the said conduit 11, a solder flux is applied to the exposed woven wire braid 23, the exposed woven wire braid 23 is then wrapped with a plurality of layers 24 of fluxed solder foil, and the stripped and wrapped end of the said flexible conduit 11 is telescoped in the end of the coupling member 10 between the outer shell 12 and tubular stem 13 thereof as illustrated in Fig. 2; the lower portion of the inner and outer walls of the outer shell 12 and inner tubular stem 13 having been previously fluxed.

The coupling member 10 is then crimped as indicated in Fig. 3 with a plurality of shallow crimps 25 and one deep crimp 26, the said deep crimp 26 being disposed over the said fluxed solder foil 24 and longitudinally inward of the ends thereof.

The coupling member 10 with the flexible conduit 11 therein is then positioned over a suitable jig 27 held on a table 28 and heat is applied as indicated by the arrows A in Fig. 3 to the coupling member 10 sufficient to braze the woven wire braid 23 to the coupling member 10 uniformly around the inner periphery of the outer shell 12 at the deep crimp 26 therein as indicated by the numerals 29 and 30 in Fig. 1.

A heat shield 31 is preferably employed if the brazing heat A is applied by means other than electrically to localize the brazing heat A whereby to prevent unnecessary melting of the lacquer coating of the composite layers 22 of the flexible shielding conduit 11.

If the coupling member 10 is of the type shown, the heat application B may become unnecessary to melt the solder 17 to braze the sleeve 18 and collar 19 to the coupling member 10. The heat application at B, if employed, is preferably simultaneous with the heat application A and is only employed to accomplish the melting of the charge of solder 17 and the brazing at 32 which is not a part or element of the instant invention.

The important item of the method of positively anchoring the flexible shielding conduit 11 in the coupling member 10 is that the fluxed solder foil 24 is crimped and held in place by the crimping 26 of the outer shell 12 and is held under crimped pressure during brazing which causes the solder or brazing material 24 to enter the interstices of the woven wire braid 23 of the shielding conduit 11 as indicated by the numeral 29 in Fig. 1, the surplus flowing to points indicated by the numeral 30 in Fig. 1. This positive uniform anchoring of the woven wire braid 23 at 29 as indicated it Fig. 1 assures complete anchorage entirely and uniformly around the fitting thereby preventing uneven stretching of the woven wire braid 22 with respect to the composite layers 22 of the flexible shielding conduit 11 during flexing which prevents the breaking or opening of the shield 23 at or near the coupling member 10 which is deleterious to 100% shielding effect and causes mechanical weakening of the flexible shielding conduit 11.

The particular method of accomplishing the connection of the flexible shielding conduit 11 to the coupling member 10 herein disclosed has been found to assure the uniform, complete and positive structural anchorage and electrical bonding of fiber glass-woven wire type flexible conduit 11 to the coupling member 10.

Although but a single illustrative method has been herein disclosed in detail, it is obvious that the advantageous method of anchoring and connecting flexible shielding conduits to coupling members may be altered to accommodate it to other like and similar types of flexible shielding conduits and coupling members than the ones herein disclosed for purposes of illustrating the invention.

I claim:

1. The method of manufacturing shielding conduit assemblies of the type wherein a flexible shielding conduit composed of a plurality of insulating layers and a woven wire shield disposed between two of said insulating layers is provided with a coupling member including a shell and a concentric stem therewithin, comprising removing the outer insulating layers sufficiently to expose said woven wire shield of said shielding conduit a distance from the end of said shielding conduit less than the depth of the coupling shell, wrapping the exposed woven wire shield with a plurality of layers of fluxed solder foil, telescoping the solder foil wrapped end of said shielding conduit within the said coupling shell and over the said stem therewithin, crimping the said shell opposite the solder foil wrapped woven wire shield to create initial circumferential pressure annularly on said solder foil wrapped woven wire shield, and applying sufficient heat to said shell opposite said solder foil wrapping therewithin to braze said woven wire shield to said shell while said solder foil is under said annular initial circumferential pressure whereupon a uniform annular anchorage of said shielding conduit within said coupling member is accomplished simultaneously with embedding solder adhering to said coupling shell in said woven wire shield.

2. The method of manufacturing shielding conduit assemblies of the type wherein a flexible shielding conduit composed of a plurality of insulating layers and a woven wire shield disposed between two of said insulating layers is provided with a coupling member including a shell and a concentric stem therewithin, comprising removing the outer insulating layers sufficiently to expose said woven wire shield of said shielding conduit a distance from the end of said shielding conduit less than the depth of the coupling shell, wrapping the exposed woven wire shield with a plurality of layers of fluxed solder foil, telescoping the solder foil wrapped end of said shielding conduit within the said coupling shell and over the said stem therewithin, crimping the said shell outwardly of and opposite the solder foil wrapped woven wire shield to create initial circumferential pressure annularly on said shielding conduit and on the solder foil wrapped woven wire shield, and applying sufficient heat to said shell opposite said solder foil wrapping therewithin to braze said woven wire shield to said shell while said solder foil is under said initial circumferential pressure whereupon a uniform annular anchorage of said shielding conduit within said coupling member is accomplished simultaneously with embedding solder adhering to said coupling shell in said woven wire shield.

THOMAS W. MILTON.